July 9, 1963  H. R. HUTCHINSON  3,096,904
SEALED PLASTIC CONTAINERS
Filed Dec. 15, 1959  2 Sheets-Sheet 1
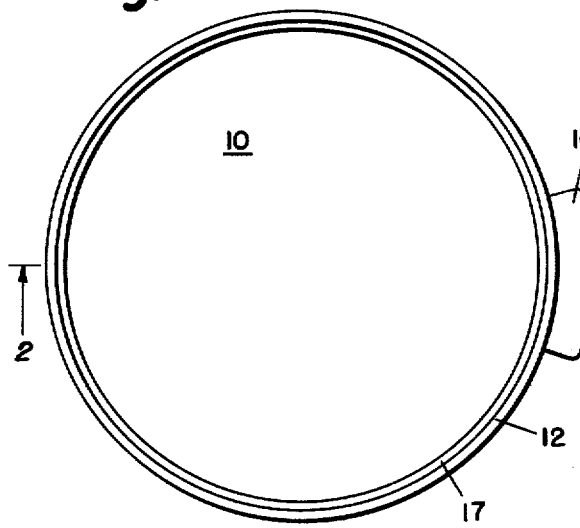
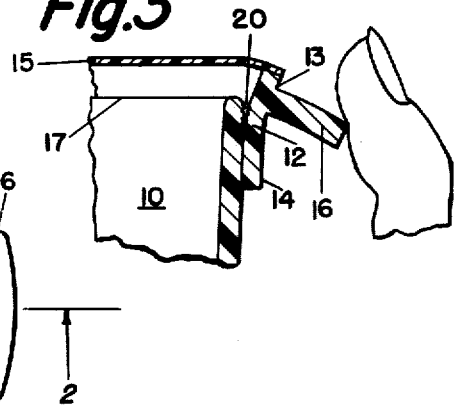
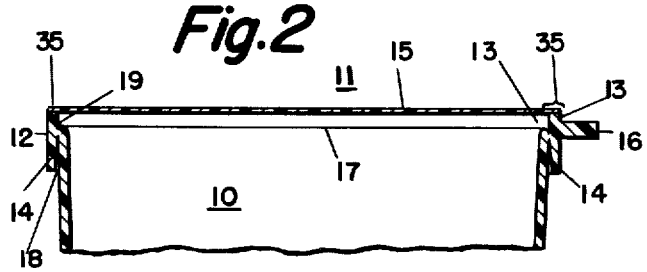
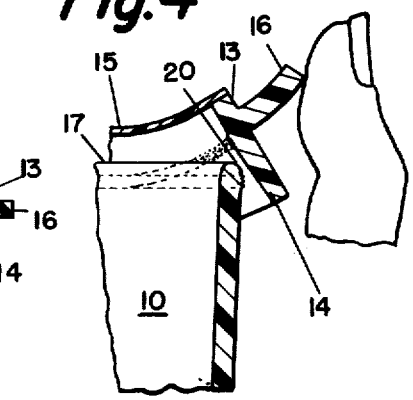
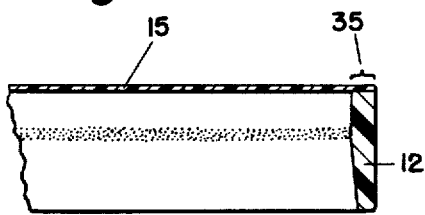
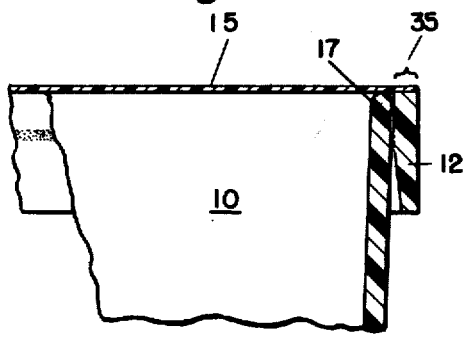

July 9, 1963 H. R. HUTCHINSON 3,096,904
SEALED PLASTIC CONTAINERS
Filed Dec. 15, 1959 2 Sheets-Sheet 2
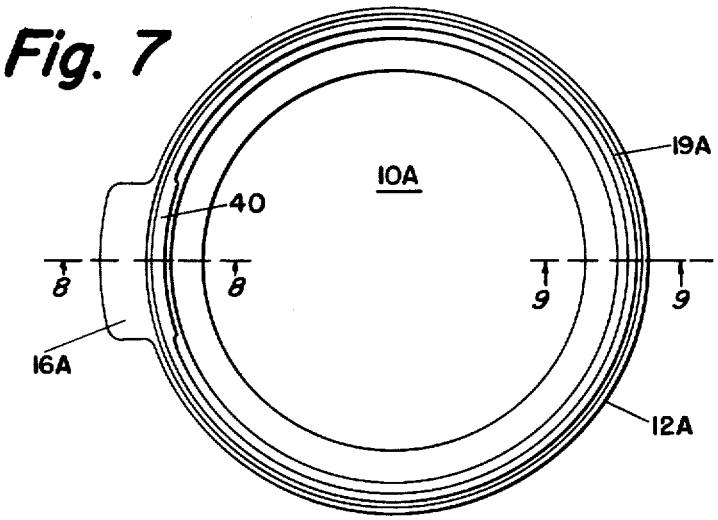
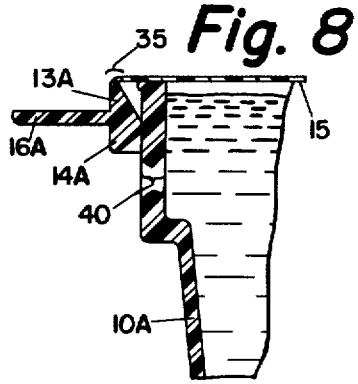
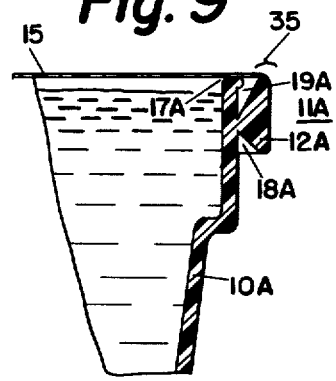
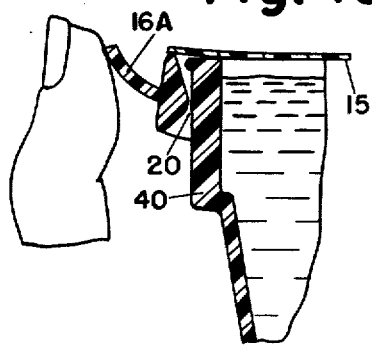
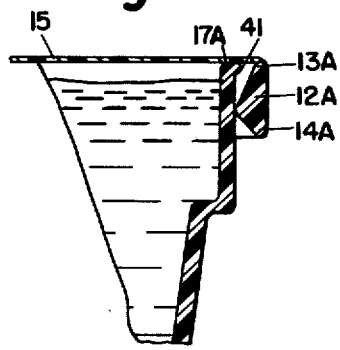

United States Patent Office 3,096,904
Patented July 9, 1963

3,096,904
SEALED PLASTIC CONTAINERS
Herman R. Hutchinson, Wyncote, Pa., assignor to Plastomatic Corporation, Malvern, Pa., a corporation of Pennsylvania
Filed Dec. 15, 1959, Ser. No. 859,685
10 Claims. (Cl. 220—47)

This invention relates to containers comprising plastic cover and body members which are sealed together for shipment and display.

In accordance with the present invention, which in some respects is concerned with improvements upon containers disclosed and claimed in copending Betner application, Serial No. 852,040, the open end of a plastic container body is formed with an integral tear-off rim having bead and skirt portions respectively extending above and below the junction of the rim with the container body. A plastic film member peripherally sealed to the bead portion of the body rim serves as a sealing cover protecting the container contents during shipment and display. The body rim is provided with an outwardly extending tab which, for initial access to the container contents, is first bent locally to break off the rim at the junction of its bead and skirt portions with the container body and is then lifted progressively to tear off the rest of the rim which in its entirety remains sealed to the untorn cover film to form therewith a reusable cover.

In one form of container, the tear-off rim extends above and below the upper edge of the container body and is there joined to it, whereas in another form of the container the upper face of the tear-off rim is substantially flush with the upper edge of the container body and the tear-off rim is joined to the container body substantially below the upper edge thereof. The latter preferred form has the advantage that when the cover film is applied to the integral rim, there need be no air space left between the film and the contents of the filled container body.

The invention further resides in plastic containers having features of novelty and utility hereinafter described and claimed.

For a more complete understanding of the invention, reference is made in the following description of various embodiments thereof to the attached drawings in which:

FIG. 1 is a top plan view of a container body;

FIG. 2 is a fragmentary side elevational view in section taken on line 2—2 of FIG. 1 with the cover film sealed to the filled container;

FIGS. 3 and 4 are fragmentary sectional views illustrating structure shown in FIG. 2 in different positions incident to opening of the sealed container;

FIG. 5 is a fragmentary sectional view of the re-usable cover;

FIG. 6 is a fragmentary sectional view showing the re-usable cover in place on the opened container;

FIG. 7 is a top plan view of a modification of the container body of FIG. 1;

FIGS. 8 and 9 are, on enlarged scale, sectional views taken on lines 8—8 and 9—9 of FIG. 7 with the container filled and the film cover applied;

FIG. 10 is a fragmentary sectional view referred to in discussion of opening of the sealed container of FIGS. 8 and 9; and FIG. 11 is a fragmentary sectional view showing the re-usable cover in place on the opened container of FIGS. 8 to 10.

Referring to FIGS. 1 and 2, the body 10 of the container 11 is formed, as by molding, of plastic material such as polypropylene, various types of polyethylene, or the like. The open end of the container body is integrally formed with a tear-off rim 12 having a bead 13 and a skirt 14 which respectively extend above and below the upper edge 17 of the container body. The inner diameter of the peripheral bead at least closely approximates the outer diameter of the container body at and below the skirt 14. The inner surface of the rim skirt 14 tapers outwardly and downwardly, forming a sharp peripheral groove 18 directed toward the apex of the peripheral groove 19 formed at the junction of the inner surface of bead 13 and the upper edge 17 of the body.

After the container body is filled with its intended contents, a plastic film cover 15 is applied over the open end of the container body and is peripherally sealed to the bead portion 13 of rim 12. Witth both the container body and the cover film of heat-sealing plastic, the peripheral seal 35 between the tear-off rim 12 and the cover film 15 may be formed by application of heat and pressure to them in the region of their engagement. Suitable film materials include polyethylene, polyethylene-coated cellophane and polypropylene. The contents of the container are thus confined and protected during shipment, storage and display by an inexpensive cover consisting only of a member of plastic film.

For initial access to the container contents, the rim 12 is smoothly torn from the body 10 along a path clearly defined by the aforesaid opposed peripheral grooves 18, 19. With the construction thus far described, it would be most difficult to tear off the rim 12 without first making a starting cut with a pointed knife or similar tool—particularly when the container body is made of polypropylene, high-density polyethylene or similar tough plastic. To avoid such inconvenience and also to avoid the possibility of injury to the person or damage to the container, the rim 12 is formed with an integral outwardly extending tab 16. When this tab is pressed downwardly (FIG. 3) or upwardly (FIG. 4), as by the thumb of the hand grasping the container, the container body is locally and temporarily deformed and the plastic between the opposed grooves 18, 19 is so highly stressed in the vicinity of the base of the tab that a short snap-break 20 there occurs. By now lifting the tab, the rim 12 easily and smoothly tears off in both directions from this break.

Upon completion of the tear-off, the rim 12 resumes its original shape with the film cover 15 intact and joined thereto throughout the sealed area 35. The rim and film now form a cap-type cover (FIG. 5) which can be pressed down over the open end of the open container (FIG. 6) with the inner face of the rim frictionally engaging the upper, outer surface of the opened container body at and below its upper edge. The tapered inner surface of the skirt now serves to facilitate reclosure of the opened container. The re-usable cap cover so pressed in place maintains a liquid-tight seal during normal handling of the container incident to its re-use for storage of the partially depleted original contents or for other storage purposes. The re-usable cover, however, can be easily peeled off by lifting the tab 16 which now serves as a convenient handle.

The container 11A shown in FIGS. 7 to 11 is generally similar to and has the advantages above discussed in connection with FIGS. 1 to 6 and in connection has other features discussed below.

In this modification, the integral tear-off rim 12A joins the container body 10A substantially below the upper edge 17A of the body and with the upper face of the bead portion 13A of the rim 12A substantially flush with and spaced outwardly from the upper face 17A of the container body. The inner surface of the bead portion 13A tapers inwardly and downwardly from its upper face to form the sharp peripheral groove 19A having its apex at the junction of rim 12A with the container body. The inner surface of the rim skirt 14A tapers outwardly and downwardly from that junction forming a sharp peripheral groove 18A directed toward the apex of groove 19A.

After the container body is filled with its intended contents, a plastic film cover 15 is applied over the open end of the container body and is peripherally sealed to the upper face of the bead portion 13A of the integral rim 12A. The cover film 15 engages but is not heat-sealed to the upper edge 17A of the container body. There need be no free air space between the cover film and the top edge 17A of the sealed container as there is with the type container shown in FIG. 2. Such free air space, avoided by the construction shown in FIGS. 8, 9, is objectionable for many packaging applications. In this type of container, the film 15 can engage the top surface of the contents and as tightly drawn against the top edge 17A during the heat-sealing is effective to prevent creeping or leakage into the deep peripheral notch 19A between edge 17A and the heat-seal between the film and the rim 12A. As with the container shown in FIGS. 1 to 6, its contents are confined and protected by an inexpensive cover arrangement consisting only of a plastic film peripherally sealed to a tear-off rim.

For initial access to the contents of the sealed container 11A, the rim 12A is smoothly torn from the body 10A along a path clearly defined by the opposed peripheral grooves 18A, 19A. To start the tear, the tab 16A extending from the rim is pressed upwardly (FIG. 10) to so highly stress the thin plastic between the opposed grooves 18A, 19A in the vicinity of the base of the tab that a short snap-break 20 there occurs. For concentration of the applied force in such vicinity, to produce a snap-break without undue distortion of the upper part of the container, the container wall is locally thickened, as indicated by the thick section 40 of FIGS. 7, 8 and 10, adjacent the base of the tab 16A. By now lifting the tab 16A, the rim 12A easily and smoothly tears off in both directions from this break, the film cover 15 remaining untorn and attached to the rim to form a re-usable cover.

In this modification, the upper edge 17A of the container has a lip or bead 41 which provides a snap-on closure when the re-usable cover formed by the torn-off rim and the film cover is pressed down over the top of the open containers (FIG. 11). As the cover is pressed down, the bead 41 engages the tapered inner surface of the rim skirt 14A temporarily expanding the rim until the peak of the angle formed by such surface and the tapered inner surface of the bead portion 13A of the rim passes below the bead whereupon the rim snaps back to its original shape for which it frictionally grips the outer periphery of the container body below the lip 41. The re-usable cover maintains a liquid-tight seal during normal handling of the container as used for storage of its partially depleted original contents or for other storage purposes subsequent to tear-off of the rim for initial access to such original contents.

Containers embodying the invention need not be of circular shape as shown in FIGS. 1 to 11 but may be rectangular, oval, octagonal or any other desired shape with retention of the features above described.

The containers described have many other advantages of significance to the manufacturer and to the merchant. Since the container consists only of a plastic body and a plastic film cover, it is very inexpensive and so is economically suitable for an extended range of inexpensive products such as fruit juices, salads, frozen fruits, dairy products including cottage cheese, ice-cream, and the like. Since the plastic body and plastic film cover are chemically inert, foodstuffs, pharmaceuticals and the like can be inexpensively packaged without danger of contamination. Also since the plastic body and the cover film may be heat-sealed to each other, the use of adhesives with consequent possibility to contamination may be avoided. The cover film may be transparent for inspection and display of the contents of the sealed container. The cover film may have printing thereon to identify the product and/or its source and at cost substantially lower than for printed molded covers. Using film of usual heat-sealing types, the container is hermetically sealed during shipment and display. When the container contents are of nature requiring that the sealed container be able to breathe, such characteristic can be attained by use of a cover film which has been irradiated or otherwise treated to obtain microporosity permitting passage of gas but precluding passage of moisture.

What is claimed is:

1. A sealed container comprising a plastic body having at its open end an integral tear-off rim defined by opposed grooves, and a plastic film member peripherally sealed to said body rim outwardly of said grooves to provide a sealed closure for the container during shipment and display, said plastic body being characterized by the provision of a tab extending outwardly from said rim and which when bent toward or away from said body member ruptures a fractional bit of the rim portion between said opposed grooves whereby the tab may then be lifted with progressive severance of the remaining portion of the rim between said opposed grooves to remove the sealed closure from the container.

2. A sealed container comprising a plastic body having a deep tear-off rim whose inner face tapers inwardly and downwardly from an upper face substantially in the plane of the upper edge of said body and is integrally joined along a narrow region with the external perimeter of said body substantially below its said upper edge, an integral tab extending outwardly from said rim, and a plastic film member peripherally sealed to said upper face of the tear-off rim and engaging said upper edge of the container body to provide a sealed closure of the plastic body during shipment and display, the bending of said tab locally breaking said narrow region of the rim away from the plastic body and the subsequent lifting of the tab effecting progressive extension of the break to separate the rim and the film closure sealed thereto from the plastic body for access to its contents and to provide a re-usable cover unit.

3. A sealed container comprising a plastic body having an integral tear-off rim which is of substantially triangular cross-section joined at one apex to the external perimeter of said body and having a second apex substantially in the plane of the upper edge of said plastic body, an integral tab extending outwardly from said tear-off rim, and a plastic film member peripherally sealed to the second apex of the tear-off rim to provide a sealed closure engaging said upper edge of the container body, the bending of said tab locally breaking said one apex of the rim away from the container body and the subsequent lifting of the tab effecting progressive extension of the break throughout the peripheral length of said apex to separate the rim and the film closure sealed thereto from the plastic body for initial access to its contents and to provide a re-usable cover unit.

4. A sealed container as in claim 3 in which the upper edge of the container body has an external lip for snap-on cooperation with said one apex of the separated rim and film-closure unit.

5. A sealed container as in claim 3 in which the side wall of the container is locally thickened for a peripheral length corresponding with that of said tab to insure said locally breaking away of the rim before excessive deformation of the upper portion of the container body.

6. A plastic container body having an integral tear-off rim which throughout its peripheral length is of substantially triangular cross-section joined at one apex to the external perimeter of the body, said rim having a tab extending outwardly therefrom and to which pressure may be applied locally to break said rim apex from the container body.

7. A plastic container body having an integral tear-off rim which is of substantially triangular cross-section joined at one apex to the external perimeter of the body, the side wall of said body being thickened for a fraction of its peripheral length, said rim having a tab extending outwardly therefrom opposite the joinder of the apex to the thickened side wall of the body, the application of bending pressure to said tab locally breaking the apex of the rim from the thickened side wall before excessive deformation of the container body.

8. A plastic container body having an integral tear-off rim which is of substantially triangular cross section with one apex in the plane of the upper edge of the container body and with a second apex joined to the external perimeter of the body below said upper edge, said rim having a tab extending outwardly therefrom for application of bending pressure thereto locally to break said rim apex from the container body.

9. A plastic container body as in claim 8 in which the side wall of the container body is locally thickened opposite the tab to insure said breaking of the rim apex before excessive deformation of the container body.

10. A plastic container body as in claim 8 in which said upper edge of the body has a lip projecting outwardly beyond the joinder of said second apex of the rim with the container body for snap-on engagement of a re-usable cover including said rim as torn from said body.

References Cited in the file of this patent

UNITED STATES PATENTS

| | | |
|---|---|---|
| 1,047,302 | Roystone | Dec. 17, 1912 |
| 1,093,735 | Shapiro | Apr. 21, 1914 |
| 1,114,323 | Westlake | Oct. 20, 1914 |
| 2,446,422 | Jensen | Aug. 3, 1948 |
| 2,711,840 | Gits | June 28, 1955 |
| 2,765,832 | Tupper | Oct. 9, 1956 |
| 2,825,194 | Page | Mar. 4, 1958 |
| 2,858,659 | West | Nov. 4, 1958 |
| 2,859,786 | Tupper | Nov. 11, 1958 |
| 2,941,660 | Tupper | June 21, 1960 |

UNITED STATES PATENT OFFICE
CERTIFICATE OF CORRECTION

Patent No. 3,096,904                          July 9, 1963

Herman R. Hutchinson

It is hereby certified that error appears in the above numbered patent requiring correction and that the said Letters Patent should read as corrected below.

Column 2, line 59, for "connection" read -- addition --.

Signed and sealed this 23rd day of June 1964.

(SEAL)
Attest:

ERNEST W. SWIDER
Attesting Officer

EDWARD J. BRENNER
Commissioner of Patents